United States Patent [19]
Halamish

[11] Patent Number: 5,934,755
[45] Date of Patent: Aug. 10, 1999

[54] ADJUSTING MECHANISM FOR A VEHICLE SEAT HEADREST

[75] Inventor: Asaf Halamish, Karkur, Israel

[73] Assignee: Raviv Precision Injection Molding, D.N. Halutza, Israel

[21] Appl. No.: 09/007,101

[22] Filed: Jan. 14, 1998

[30] Foreign Application Priority Data

Jan. 15, 1997 [IL] Israel .......................................... 12010

[51] Int. Cl.$^6$ ....................................................... A47C 7/36
[52] U.S. Cl. ............................ 297/410; 297/391; 297/404
[58] Field of Search .................................... 297/410, 391, 297/404

[56] References Cited

U.S. PATENT DOCUMENTS

| | | | |
|---|---|---|---|
| 3,512,832 | 5/1970 | Kage .......................................... | 297/410 |
| 3,512,833 | 5/1970 | Sugiura ...................................... | 297/410 |
| 3,563,602 | 2/1971 | Ohta et al. ................................. | 297/410 |
| 4,411,470 | 10/1983 | Nishimura et al. ....................... | 297/410 |
| 4,483,565 | 11/1984 | Terui et al. ................................ | 297/410 |
| 4,604,777 | 8/1986 | Meeks ................................... | 297/410 X |
| 4,678,232 | 7/1987 | Ishida et al. .......................... | 297/410 X |
| 4,976,493 | 12/1990 | Frankila .................................... | 297/410 |
| 5,156,440 | 10/1992 | Vidwans ................................... | 297/410 |
| 5,529,379 | 6/1996 | Stocker .................................... | 297/410 |
| 5,660,441 | 8/1997 | Nagayasu et al. .................... | 297/391 X |
| 5,667,276 | 9/1997 | Connelly et al. ..................... | 297/391 X |

Primary Examiner—Peter M. Cuomo
Assistant Examiner—Rodney B. White
Attorney, Agent, or Firm—Birch, Stewart, Kolasch & Birch, LLP

[57] ABSTRACT

A head rest support mechanism for a vehicle seat, the head rest being fitted with at least one support rod having a plurality of notches and being supported by the seat back and adapted for vertical adjustment with respect thereto, the support mechanism further including a guiding member fixed to the seat back and comprising a bore slidingly and snugly supporting the support rod. There is a latching spring supported by the guiding member and having one end fixed to the guiding member, another end projecting from the guiding member, and an intermediate, looped, notch engaging portion being normally biased to engage a portion of a notch. The support rod comprises a plurality of notches each lying in a plane which is perpendicular to a longitudinal axis of the rod and a normal of the plane is not perpendicular to the longitudinal axis. The arrangement is such that axial displacement of the support rod in an upward direction entails lateral displacement of the notch engaging portion so as to disengage from the notch, and downward displacement of the supporting rod is possible only upon laterally displacing the notch engaging portion by expelling the projecting end of the latching spring.

9 Claims, 6 Drawing Sheets ns, 5,934,755

ADJUSTING MECHANISM FOR A VEHICLE SEAT HEADREST

FIELD OF THE INVENTION

The present invention is in the field of vehicle seat headrests. More particularly, it is concerned with an improved mechanism for vertical adjustment and restraint of a headrest.

BACKGROUND OF THE INVENTION

Vehicle seats are designed in accordance with ergonomic requirements and in accordance with strict safety requirements defining the strength which must be met by the seat components in case of collision. Seats must be designed such that vehicle occupants with different body dimensions do not suffer from driving fatigue, on the one hand, and on the other hand, in case of collision, suitable protection and body support is provided.

The headrest of a vehicle seat, apart from serving as a head support for comfort and preventing driving fatigue, has an important role in preventing so-called whiplash—type injuries of a person's head in case of collision.

It is accordingly important that the headrest be adjustable in height, so as to meet the specific personal body dimensions of a vehicle's occupant and that in case of sudden impact the head rest does not spontaneously change its position.

Heretofore, a variety of mechanisms have been provided for adjusting the height of a headrest support of a vehicle's seat.

One way of controlling vertical adjustment is by providing some friction means between the headrest support rods and a housing member mounted within a back rest portion of the vehicle's seat. However, a serious drawback of such mechanisms is that friction conditions may change and accordingly positioning of the headrest may unintentionally be changed.

Other means for vertically adjusting a headrest are disclosed, for example, in U.S. Pat. No. 5,156,440, wherein the support rod comprises a plurality of V-shaped notches engageable by a wire spring. However, the disclosure according to this patent provides vertical displacement of the headrest, in both directions (i.e. upwards and downwards) by applying sufficient force in a vertical direction by the occupant. According to this Patent there are no means for unequivocal restraining the head rest at least in a downward direction, and accordingly there are no provisions of any manually operated release means for selectively adjusting the head rest. The drawback involved with such an arrangement is that in case of collision, the headrest may unintentionally change its vertical position in a downward direction, possibly causing severe injury by failing to support an occupants head.

It is the object of the present invention to provide a new and improved headrest support mechanism for adjusting the vertical position of a headrest of a vehicle seat.

BRIEF DESCRIPTION OF THE INVENTION

According to the present invention, there is provided an adjustment mechanism for a headrest of a vehicle seat, the head rest being fitted with at least one support rod supported by a seat back of the seat and adapted for vertical adjustment with respect thereto, said adjusting mechanism comprising:

a guiding member fixed to the seat back and comprising a bore slidingly and snugly supporting the at least one support rod;

a latching spring supported by the guiding member and having two ends, one of which is fixed to the guiding member, and the other end bring free and projecting from the guiding member, and an intermediate, looped, notch engaging portion being normally biased to engage a portion of a notch;

at least one of said at least one support rod comprises a plurality of notches each lying in a plane which is perpendicular to a longitudinal axis of the rod and wherein a normal of the plane intersects said longitudinal axis;

the arrangement being such that axial displacement of the support rod in an upward direction entails lateral displacement of the notch engaging portion so as to disengage from the notch, and wherein downward displacement of the supporting rod is possible only upon laterally displacing the notch engaging portion by expelling the projecting end of the latching spring.

According to the present invention, the headrest may be upwardly adjusted by merely applying some vertical force on the headrest, whereas displacing the headrest downwards requires manually actuating of the support member, so as to release the support rod from engagement with the latching spring.

According to an embodiment of the present invention, the lowermost notch on said supporting rod extends at an inverted angle with respect to the other notches. In accordance with this preferred embodiment, the support rod may be retracted altogether from the guiding member only upon manual displacement of the latching spring.

In accordance with still another embodiment of the present invention, the free end of the latching spring is expellable in a direction of the lateral displacement of the notch engaging portion or in a second lateral direction being perpendicular thereto.

According to a modification of the present invention, the guiding member further comprises a stopper wall portion for preventing expelling of the free end of the latching spring in a second lateral direction being perpendicular to a direction of the lateral displacement of the notch engaging portion.

According to still a further embodiment of the invention, the latching spring further comprises a bracing portion intermediate the fixed end and the notch engaging portion, said bracing portion adapted for frictionally bracing an arcuate portion of the support rod when the notch engaging portion is engaged with a notch, and disengaging the rod upon lateral displacement of the notch engaging portion.

Preferably, the latching spring further comprises at least one second looped portion restrained from displacement in the direction of the longitudinal axis, for preventing torsion of the latching spring.

BRIEF DESCRIPTION OF THE DRAWINGS

For better understanding, the invention will now be described by way of example only, with reference to the accompanying drawings, in which.

DETAILED DESCRIPTION OF SPECIFIC EMBODIMENTS

Figure 1:
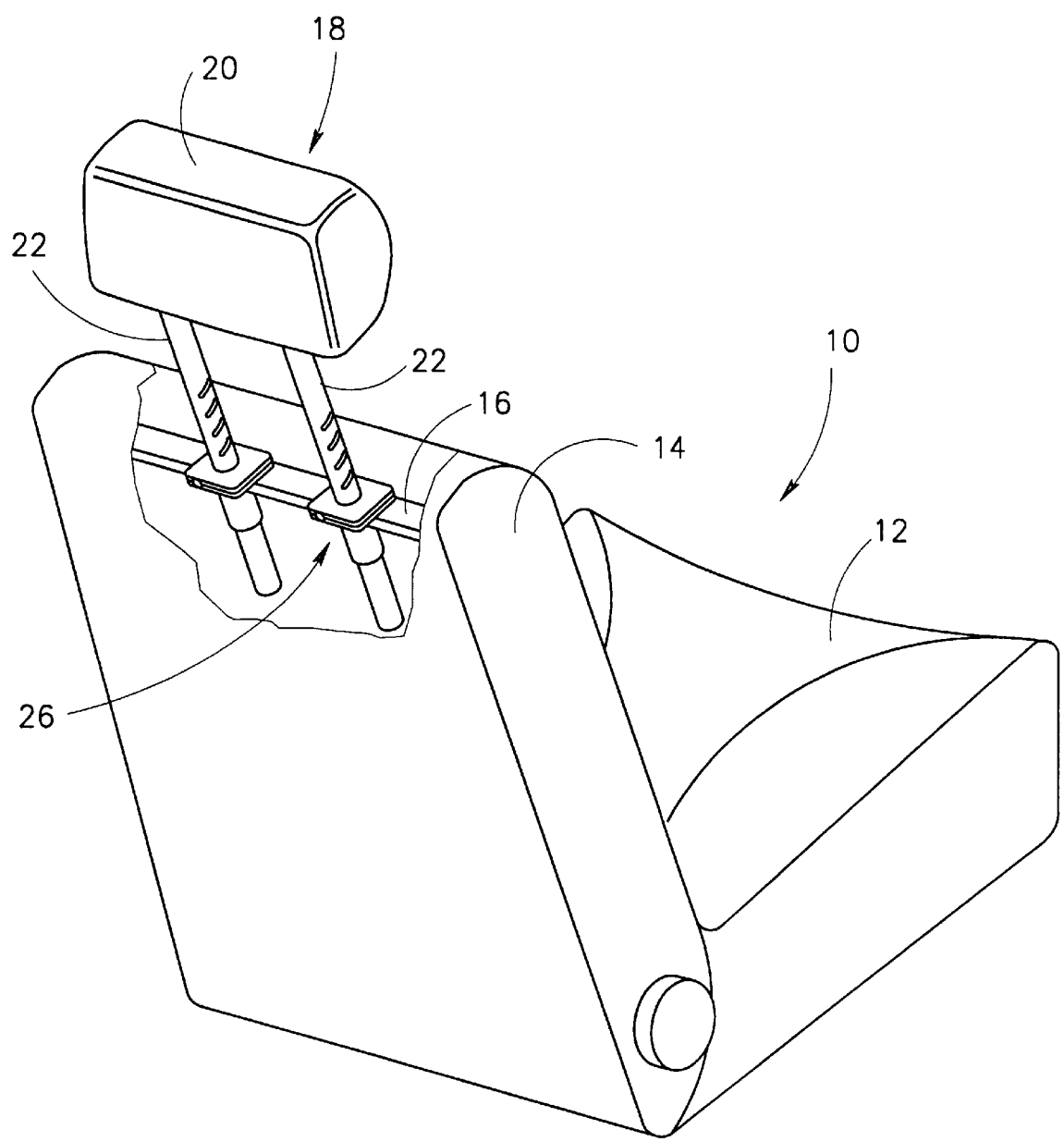
FIG. 1 is a partially sectioned perspective view of a vehicle seat assembly, comprising an adjustable headrest.

Attention is first directed to FIG. 1 of the drawings showing a vehicle seat assembly 10 comprising a seat portion 12 and a backrest portion 14 comprising a metal construction framework 16. A headrest assembly generally designated 18 comprises a cushioned headrest 20 pivotally connected to two support rods 22, each slidingly received by a guiding member 26 attached to the framework 16, wherein the guiding member 26 is concealed within the seat, apart from a top cover 28 and an operating knob 30 (see FIG. 2).

Figure 2:
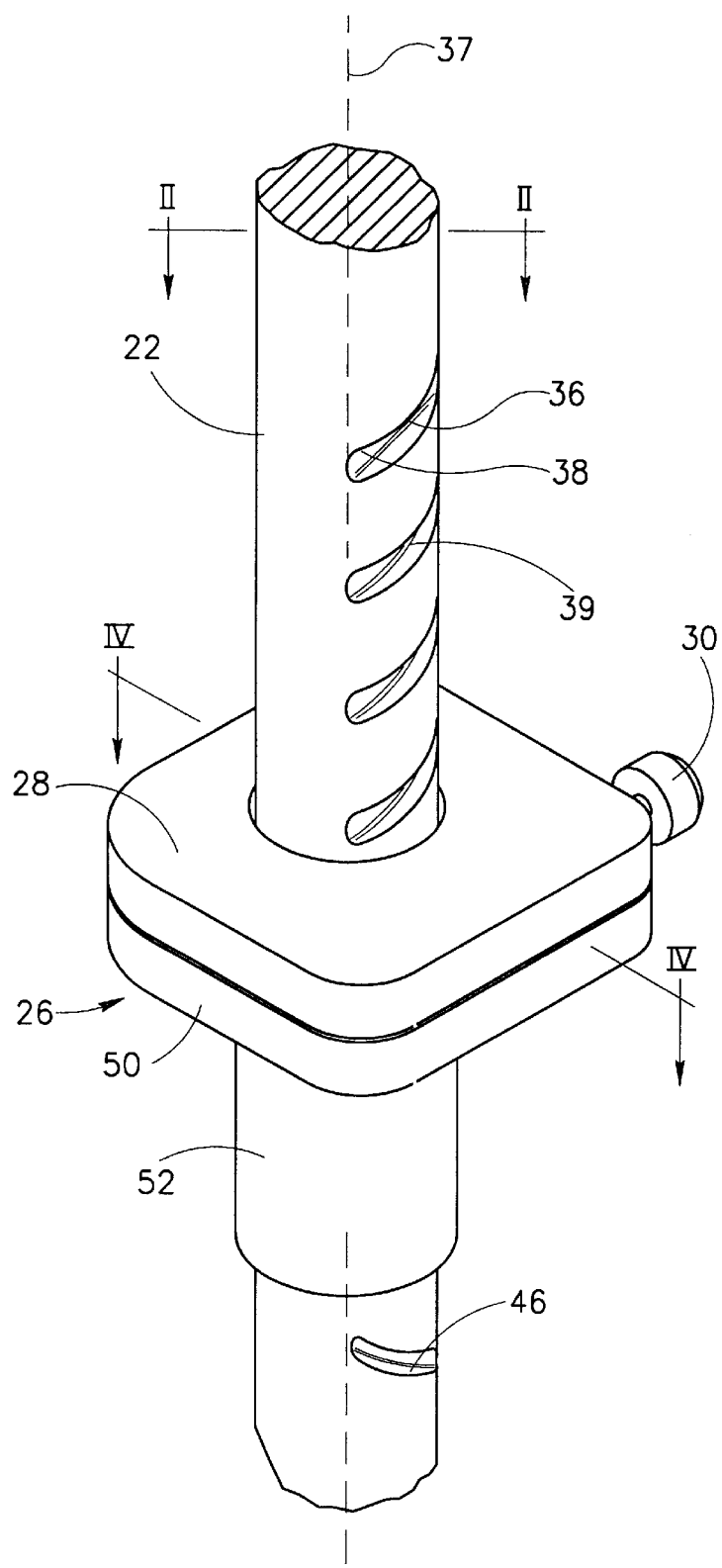
FIG. 2 is a perspective view of the headrest support mechanism, in an enlarged scale.
Figure 2A:
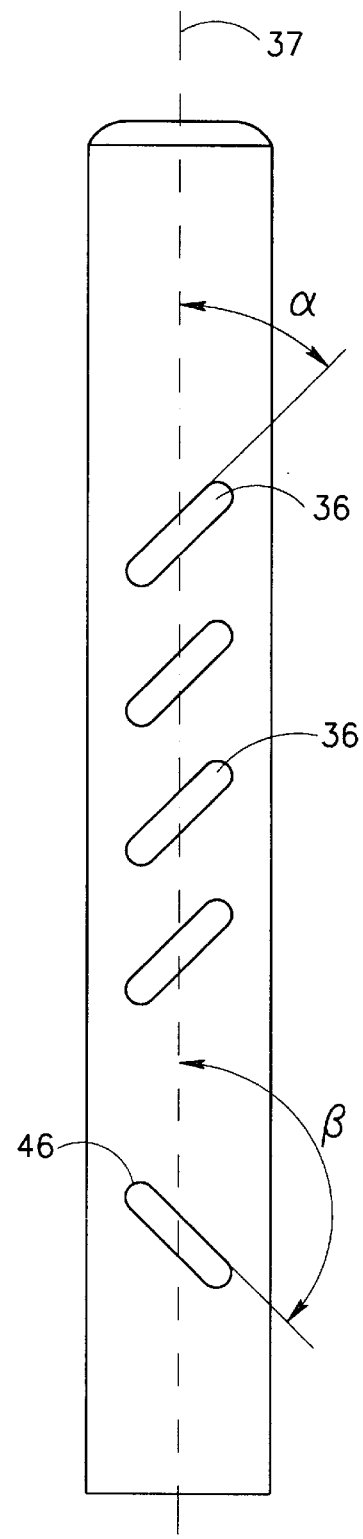
FIG. 2a is a front elevation of the support rod seen in FIG. 2.

As can be seen in more detail in FIGS. 2 and 2a, support rod 22 comprises a plurality of notches 36, each lying in a plane which is perpendicular to a longitudinal axis 37 of the rod and wherein a normal of the plane intersects the longitudinal axis 37 and forms an acute angle α herebetween. Preferably the angle α is in the range of 45°±10°. It should be clear that either one or both support rods 22 are notched as seen in FIG. 2.

As can further be seen in FIGS. 2 and 2a, a lowermost notch 46 lays in a plane extending at an angle β with respect to the longitudinal axis 37, said angle β forming a complimentary angle with respect to angle α. However, angle β may be other than a complimentary angle as long as it forms an obtuse angle with the longitudinal axis 37.

Guiding member 26 consists of a base portion 50 fitted with a downward projecting tubular section 52 adapted for slidingly and snugly supporting the rod 22. As mentioned hereinbefore, the guiding member 26 comprises a top cover 28 attached to the base 50 which is concealed within the upholstery of the seat 10.

Further reference will now be made to FIGS. 4a and 4b in which a latching spring 56 has an end leg portion 58, a first intermediate arcuate portion 60, a second intermediate, looped, notch-engaging portion 62 and a second end portion 64 fitted with a pressing knob 66. The base portion 50 of the guiding member 26 is formed with an opening generally designated 70 having a groove 72 for fixedly accommodating end leg portion 58 of the latching spring 56. The opposed end 64 of the spring 56 projects from the base member 50 and in a normal position the notch engaging portion 62 of latching spring 56 projects over a top opening of the tubular section 52, the arrangement being such that the second end portion 64 is capable of axial displacement only, in direction of arrow 76 (see FIG. 4b), due to the direction of opening 51 in the base portion 50.

Figure 4A:
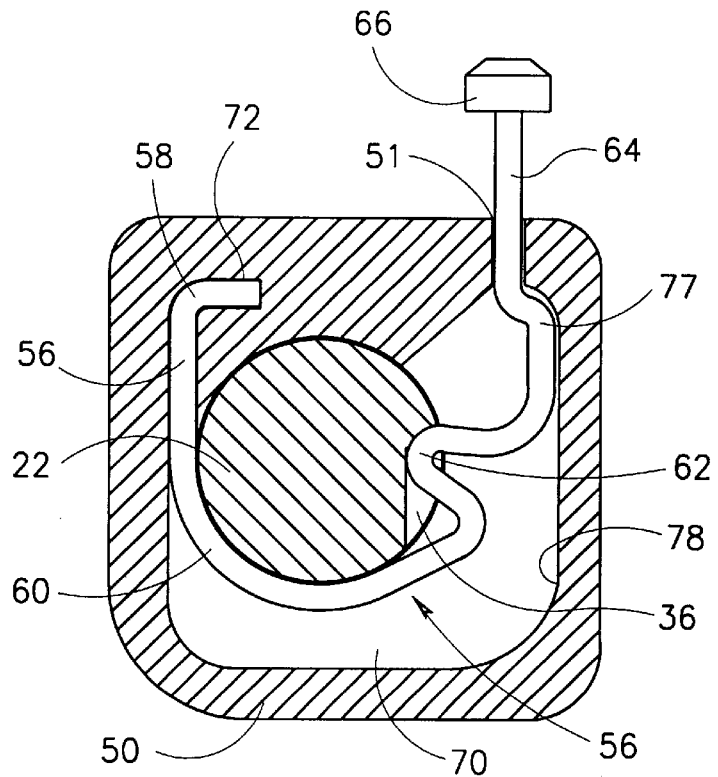
FIGS. 4a and 4b are sectional views along the lines IV—IV in FIG. 2, in the engaged and disengaged positions, respectively.
Figure 4B:
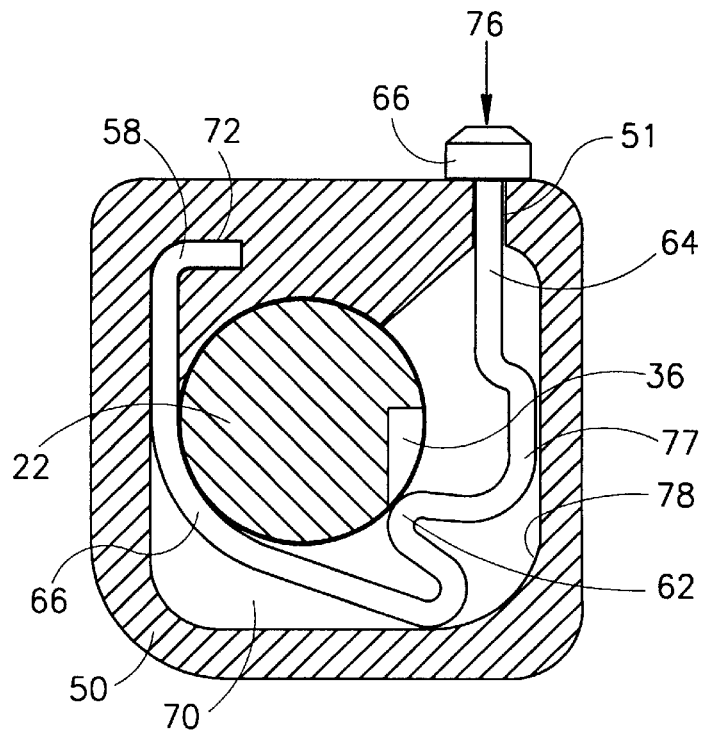

The arrangement is such that displacement of pressing knob 66 in the direction of arrow 76 entails lateral displacement of notch engaging portion 62 away from the top opening of tubular portion 52 as in the position shown in FIG. 4b.

The outcome is that vertical displacement of the support rod 22 in an upward direction applies a horizontal force component on the notch engaging portion 62 of the latching portion, whereby the notch engaging portion is laterally propelled into the position shown in FIG. 4b, where the notch engaging portion of the latching spring disengages from notch 36. However, raising the headrest 18 is obtained by merely applying some vertical force on the head rest in an upward direction, so as to allow the latching spring to disengage the notches 36 in a "clicking" manner.

However, an attempt to apply vertical force on the headrest 18 and consequently on support rod 22 in a downward direction entails clamping engagement of the notch engaging portion 62 of spring 56 within the notch 36, thus preventing downward displacement of the support rod.

The arrangement is such that removing rods 22 from the guiding member so as to remove the headrest 18 from the seat portion 14 is possible only upon manual expelling of knob 66 in the direction of arrow 76 so as to disengage the notch engaging portion 62 from the lowermost groove 46.

Figure 3:
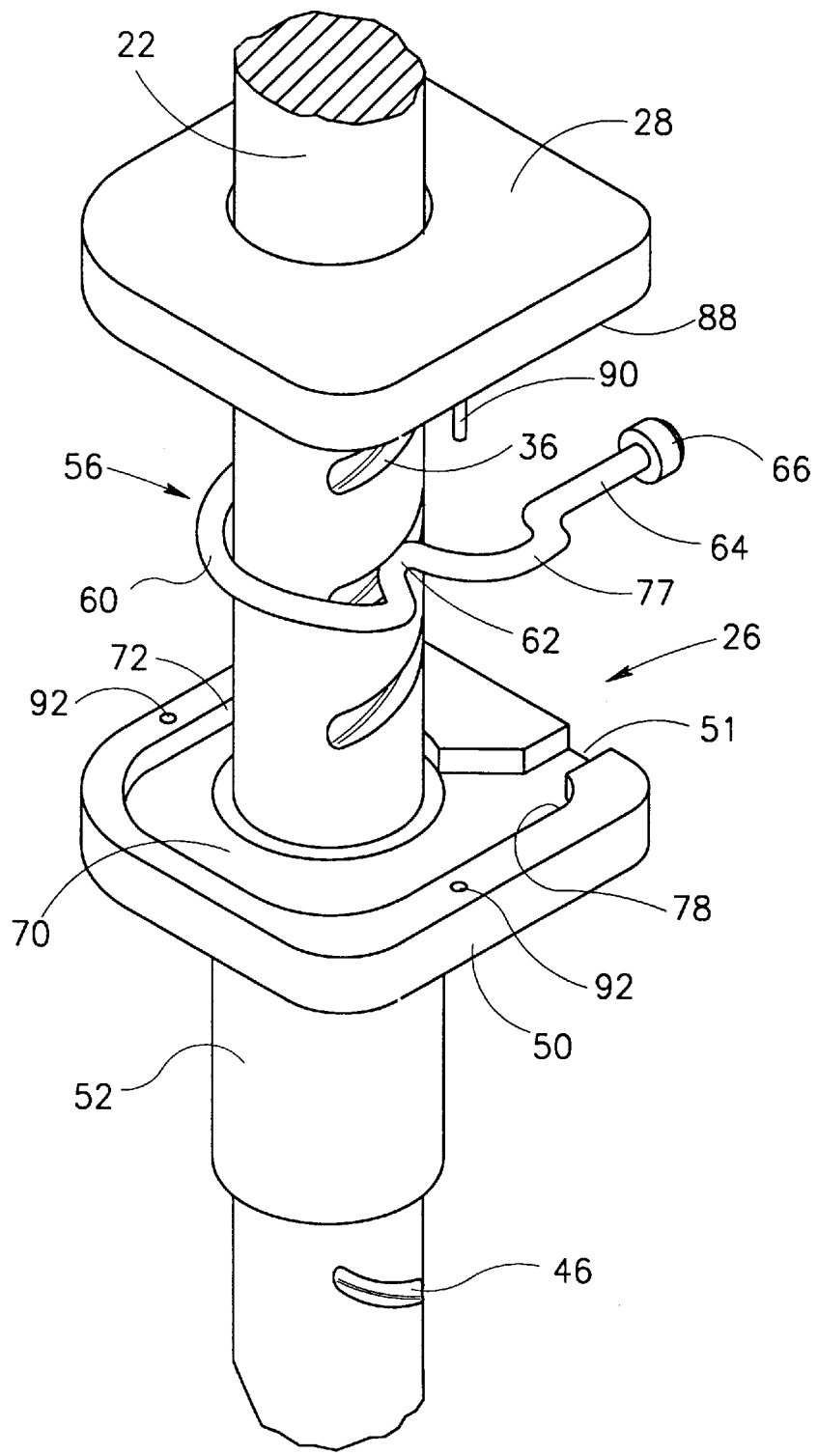
FIG. 3 is an exploded perspective view of the headrest support and restraint mechanism, in accordance with the first embodiment of the present invention.

As can further be seen in FIGS. 3 and 4, the latching spring 56 comprises a second looped portion 77 adapted for sliding along an essentially straight inner wall 78 of base member 50. The purpose of this arrangement is to ensure engagement of latch engaging portion 62 with a grove 36, as in FIG. 4a.

Figure 5:
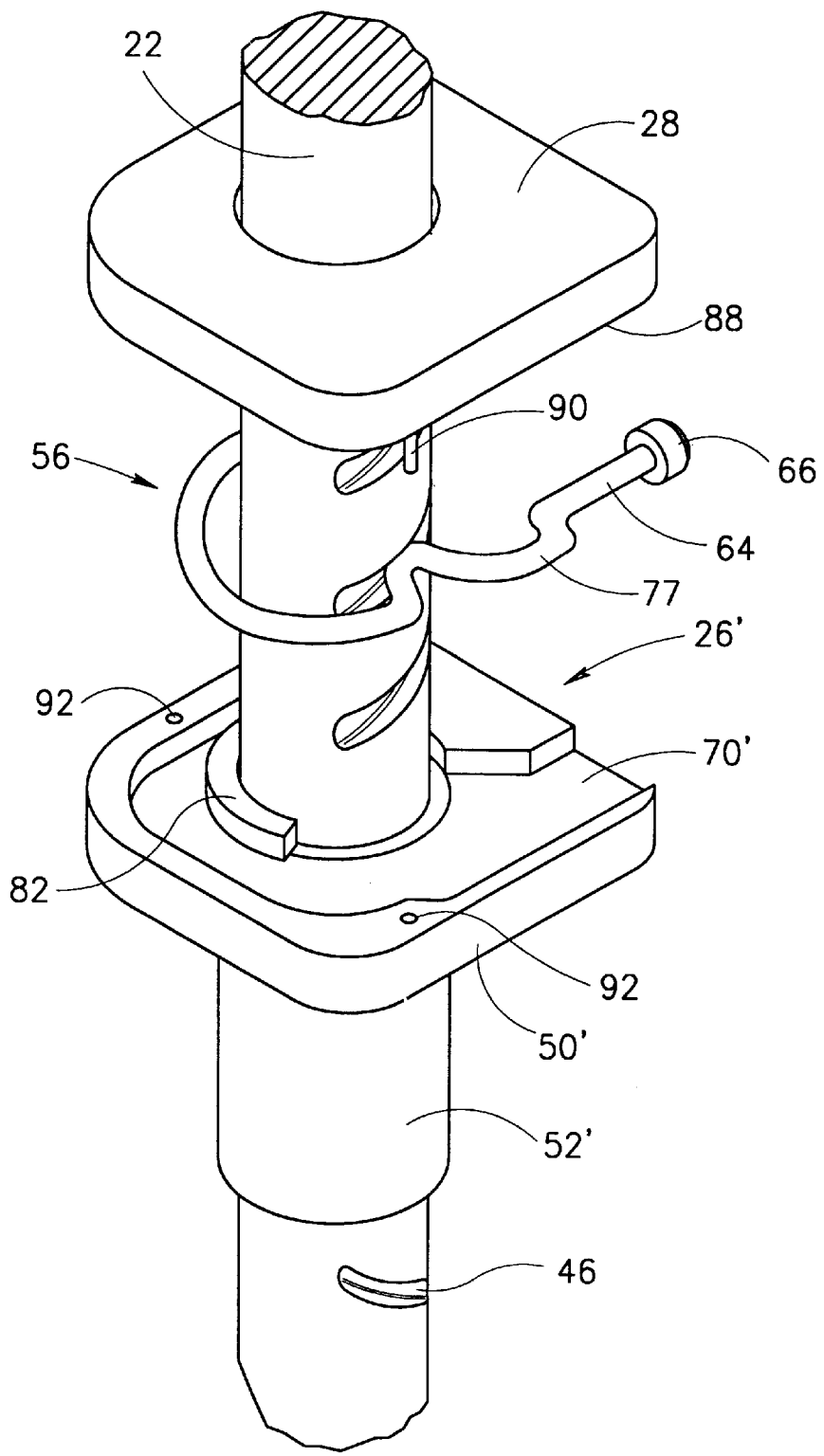
FIG. 5 is an exploded view of a second embodiment of a headrest restraint mechanism, in accordance with the present invention.
Figure 6A:
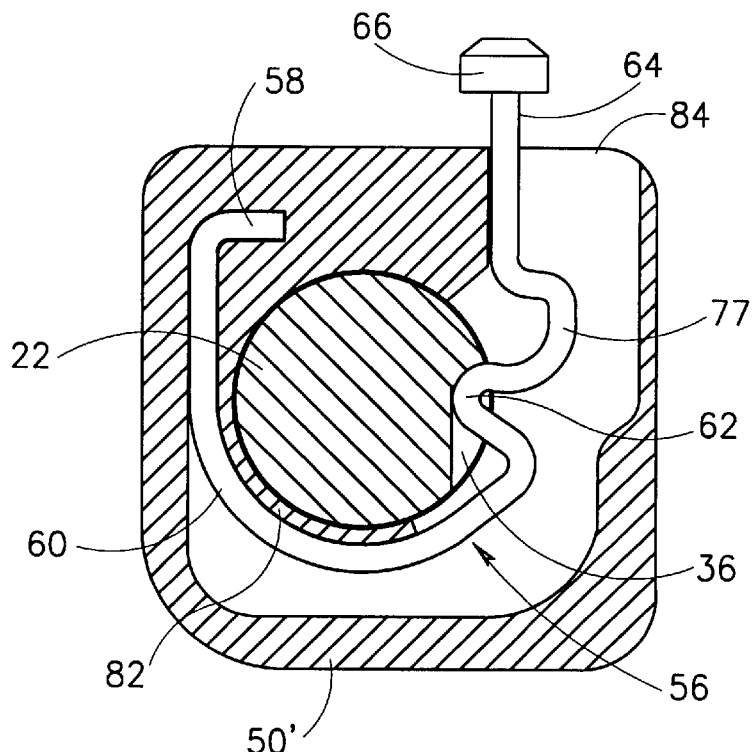
FIGS. 6 and 6b are cross-sectional views along line IV—IV in FIG. 2 of a second embodiment of a headrest support and restraint mechanism in accordance with the present invention, in the engaged and disengaged position, respectively.

Further attention is now directed to FIGS. 5 and 6, illustrating a further embodiment of the present invention and in which like elements and components are given the same reference numerals as the corresponding ones in FIGS. 3 and 4 with a prime indication and unaltered elements are given the same reference numerals as in FIGS. 3 and 4. The reader is referred to those previous Figures for a detailed explanation.

The base portion 50' of guiding member 26' comprises a bearing wall 82 arcuately extending along a portion of the top opening of tubular portion 52'. Additionally, projecting end 64 of the latching spring 56 projects through a wide opening 84 of the base member 50' which enables lateral displacement of the projecting portion 64 also in a direction perpendicular to the direction of arrow 76 in FIG. 4b.

The purpose of bearing wall 82 is to prevent friction engagement of bracing portion 60 of the latching spring 56, with the rod 22, for smoother vertical displacement of the rod.

Figure 6B:
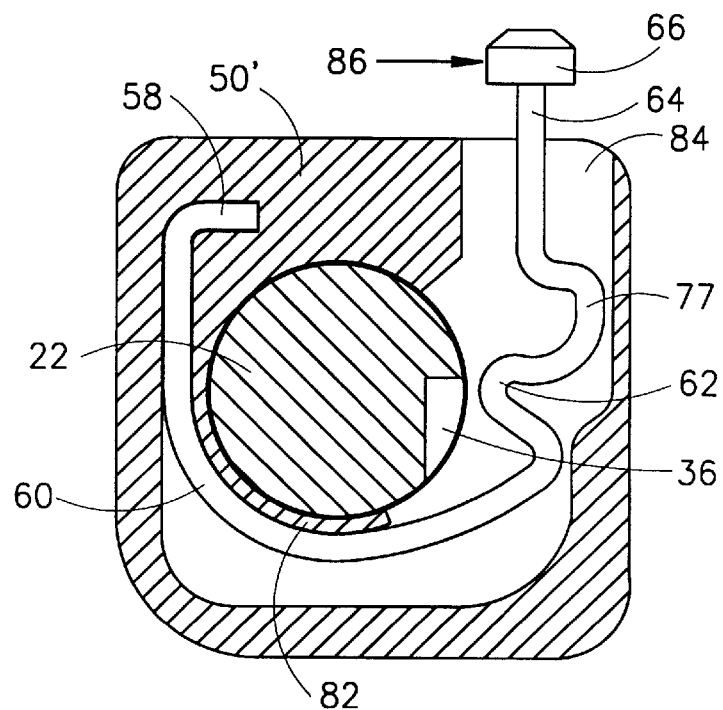

The arrangement according to this embodiment is such that displacing the headrest in an upward direction is carried out as explained with respect to FIGS. 3 and 4. However, displacing the headrest in a downward direction is possible only upon manually expelling of knob 66 in the direction of arrow 86 or in the direction of arrow 76, whereby, the notch engaging portion 62 disengages from groove 36, as can be seen in FIG. 6b.

Similar to the previous embodiment, the rod 22 comprises a lowermost notch 46 which is inclined at an inverted angle with respect to the other notches 36 for preventing unintentional removal of the head rest from the back rest portion of the seat.

As can be seen in FIGS. 3 and 5, the depth of openings 70 and 70', respectively, is essentially the same as the diameter of the latching spring 56. The bottom face 88 of cover 28 of the guiding member 26 is essentially comprises several downward projecting pins 90 (only one seen in FIGS. 3 and 5) adapted for insertion into suitable holes 92 in base portions 50 and 50', for correct positioning of cover 28 over base portion 50 and 50', respectively.

It will thus be appreciated that the second looped portion 77 serves also for preventing torsion of the latching spring 56 by opposing the moment applied by vertical forces from the rod 22 on the notch engaging portion 62.

It should be obvious to a person versed in the art that the invention is not restricted to a wire-type latching spring and the same may be obtained by using other shapes and forms of a latching spring.

It should also be understood that the base member 50 and the top cover 28 of the guiding member 26 may be attached to one another in a variety of known ways e.g, sonic welding, adhering, snap fitting, screws, etc.

I claim:

1. An adjusting mechanism for a headrest of a vehicle seat, the head rest for being supported by a seat back of the seat and adapted for vertical adjustment with respect thereto, said adjusting mechanism comprising:

at least one support rod for supporting the headrest;

a guiding member for being fixed to the seat back and comprising a bore slidingly and snugly supporting the at least one support rod;

a latching spring supported by the guiding member and having two ends, one of which is fixed to the guiding member, and the other end being free and projecting from the guiding member, and an intermediate, looped notch engaging portion being normally biased to engage a portion of a notch;

at least one of said at least one support rod comprises a plurality of notches, each notch lying in a respective first plane which is perpendicular to a longitudinal axis of the rod and wherein a second plane perpendicular to the first plane is tilted with respect to said longitudinal axis;

the arrangement being such that axial displacement of the support rod in an upward direction entails lateral displacement of the notch engaging portion so as to disengage from the notch, and wherein downward displacement of the supporting rod is possible only upon laterally displacing the notch engaging portion by expelling the projecting end of the latching spring.

2. An adjusting mechanism according to claim 1, wherein a lowermost notch on said supporting rod extends at an inverted angle with respect to the other notches.

3. An adjusting mechanism according to claim 1, wherein the free end of the latching spring is expellable in a direction of the lateral displacement of the notch engaging portion or in a second lateral direction being perpendicular thereto.

4. An adjusting mechanism according to claim 1, wherein the guiding member further comprises a stopper wall portion for preventing expelling of the free end of the latching spring in a second lateral direction being perpendicular to a direction of the lateral displacement of the notch engaging portion.

5. An adjusting mechanism according to claim 1, wherein the latching spring further comprises a bracing portion intermediate the fixed end and the notch engaging portion, said bracing portion adapted for frictionally engaging an arcuate portion of the support rod when the notch engaging portion is engaged with a notch, and disengaging the rod upon lateral displacement of the notch engaging portion.

6. An adjusting mechanism according to claim 1, wherein the latching spring bears against a bearing wall portion formed within the guiding member, said wall portion preventing inward directed lateral displacement of the notch engaging portion.

7. An adjusting mechanism according to claim 1, wherein the latching spring further comprises at least one second looped portion restrained from displacement in the direction of the longitudinal axis, for preventing torsion of the latching spring.

8. A support rod for a head rest of a vehicle's seat, the support rod for being fixed at a top end thereof to the headrest and for having a portion slidingly received within a seat back of the seat, the support rod comprising a plurality of notches, each notch lying in a respective first plane perpendicular to a longitudinal axis of the rod and wherein a second plane perpendicular to the first plane is tilted with respect to said longitudinal axis.

9. A support rod according to claim 8, wherein a lowermost notch of said supporting rod extends at an inverted angle with respect to the other notches.

* * * * *